July 5, 1932.  D. RUSSO  1,866,324
AUTOMATICALLY TURNING HEADLIGHT FOR VEHICLES
Filed Dec. 12, 1930
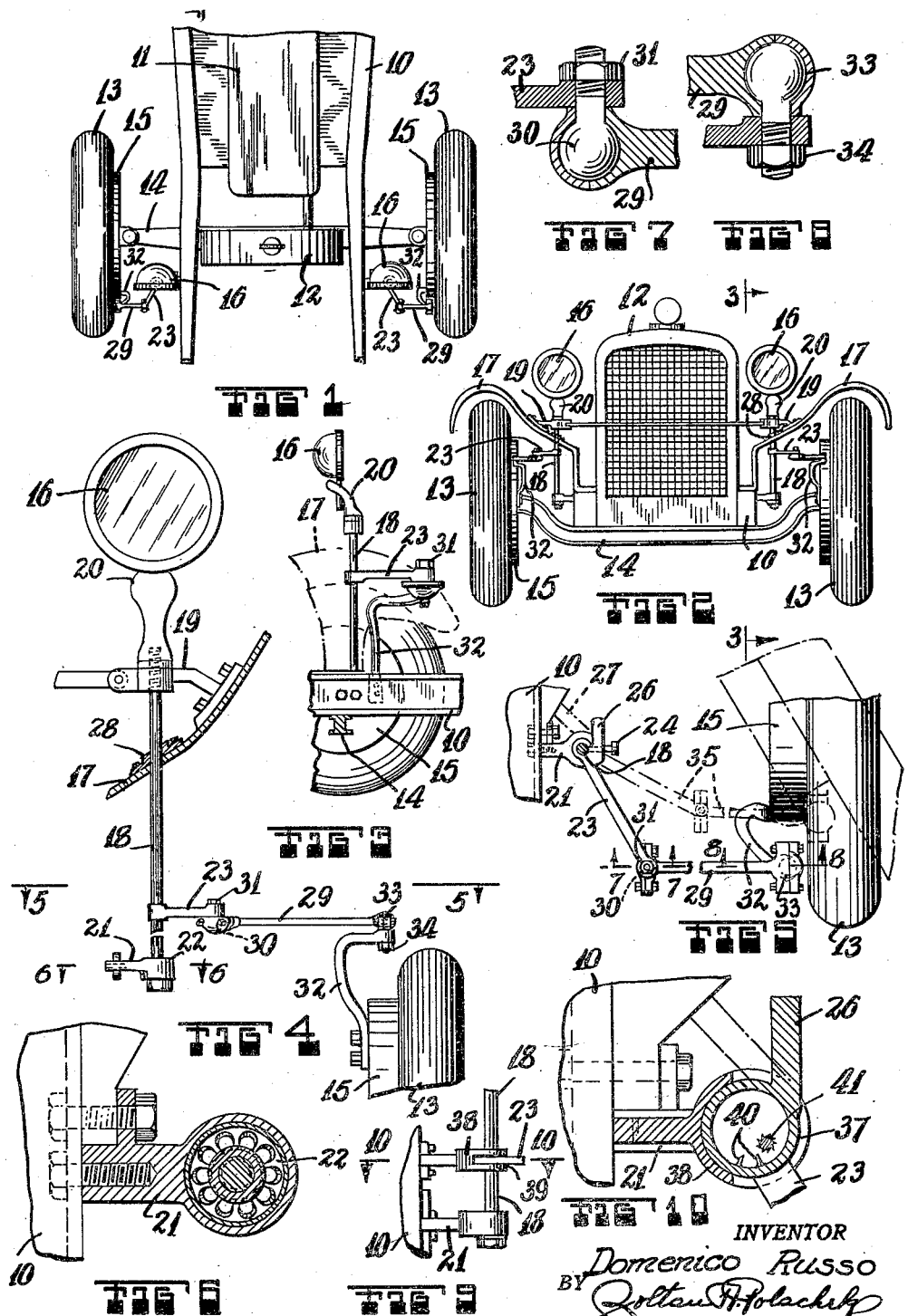
INVENTOR
Domenico Russo
BY Zoltan A. Polachek
ATTORNEY Patented July 5, 1932

1,866,324

UNITED STATES PATENT OFFICE

DOMENICO RUSSO, OF JERSEY CITY, NEW JERSEY

AUTOMATICALLY TURNING HEADLIGHT FOR VEHICLES

Application filed December 12, 1930. Serial No. 501,819.

This invention relates to new and useful improvements in automatically turning headlights for vehicles.

The invention has for an object the provision of a device of the class mentioned which is characterized by an arm for rigid attachment upon the stationary brake drum of the front wheels of a vehicle to follow the turning of the wheel and connected with a headlight to turn the latter element for illumination of the road in front of the turn.

A still further object of this invention is to support the headlight upon a vertical rod rotatively mounted upon the chassis of the vehicle, and to provide a radial arm attached upon said rod and connected with a link connecting with the arm which attaches with the brake drum.

As a still further object of this invention it is proposed to provide a stop for limiting turning of said headlight so as to prevent the links which cause the turning from moving into dead positions.

It is a still further object of this invention to pass the vertical rod which supports the headlight through the fender of the vehicle and to provide a turning bracket on the fender to act as trimming.

A still further object of this invention is to provide a means for turning the headlight through a larger angle than initial turning of the front wheels, then maintaining the light stationary during further turning of the front wheels, and finally to further turn the headlight upon still further turning of the front wheels.

And a still further object of this invention is to provide a device of the class mentioned which is of simple durable construction, dependable in use and efficient in action, and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a fragmentary plan view of the chassis of a motor vehicle provided with a device constructed according to this invention.

Fig. 2 is a front elevational view of Fig. 1 shown with fenders also.

Fig. 3 is a fragmentary sectional view taken on the line 3—3 of Fig. 2.

Fig. 4 is a fragmentary enlarged detailed view of a portion of Fig. 2.

Fig. 5 is a fragmentary horizontal sectional view taken on the line 5—5 of Fig. 4.

Fig. 6 is a fragmentary horizontal enlarged sectional view taken on the line 6—6 of Fig. 4.

Fig. 7 is a fragmentary enlarged detailed sectional view taken on the line 7—7 of Fig. 5.

Fig. 8 is a fragmentary enlarged sectional view taken on the line 8—8 of Fig. 5.

Fig. 9 is a view similar to a portion of Fig. 4, but illustrating a modified form of the device.

Fig. 10 is a fragmentary sectional view taken on the line 10—10 of Fig. 9.

On the drawing a portion of a motor vehicle has been illustrated, in which the chassis is indicated by reference numeral 10, the motor by numeral 11, the radiator numeral 12, and the front wheels by numerals 13. This is supposed to indicate the vehicle of any conventional type. It should be noticed that the wheels 13 are mounted upon a front axle 14 and brake drums 15 are arranged adjacent the wheels as is customary construction. These brake drums preferably are of the type having an external stationary part and internal braking members.

It is customary to provide a pair of headlights such as 16 upon the front of the vehicle. Each of these headlights are located between the radiator 12 and the fenders 17 of the vehicle. A means is provided for supporting each headlight to pivot on a vertical axle which includes a vertical rod 18. The means consists of a bracket 19 attached upon the fender and rotatively supporting the top of the vertical rod 18. The headlight 16 is provided with a foot 20 which threadedly engages upon the top of the vertical rod 18. A second bracket 21 is attached upon the chassis of the vehicle and supports a thrust bearing 22 receiving the lower end of the rod 18 to accomplish the rotative supporting of the rod.

A radial arm 23 projects from the rod 18 and is held in fixed positions on the rod by a set screw 24. The radial arm 23 is provided with a finger 26 which is adapted to engage against the portion of the chassis, as indicated by the dot and dash lines 27, to limit possible turning of the rod. The radial arm 23 projects towards the front and towards one side, preferably at an angle substantially as shown in Fig. 5. A bracket 28 is attached upon the fender 17 at the point where the rod 18 passes through the fender to constitute trimming. A link 29 pivotally connects at one end on the radial arm.

The pivotal connection of the link 29 on the radial arm is accomplished by a bolt 30 having a head engaged within the link 29 and extending through the radial arm 23 and held in this position by a nut 31 which threadedly engages upon the stem portion of the bolt. Another arm 32 pivotally connects with the other end of the link 29 and is intended for rigid attachment upon the stationary brake drum 15 of one of the front wheels of the vehicle. The arm 32 is bent so as to extend forwards and its pivot connection with the link 29 is accomplished by a screw 33 having a spherical head engaged within a portion of the link 29, a stem projecting downwards through the arm 32, and a nut 34 threadedly engaged upon the stem. As the wheel turns during the steering of the vehicle, the arm 32 will be similarly moved up and cause the link 29 and the radial arm 23 to move correspondingly as indicated by the dot and dash lines 35. The moving of the rod 18 causes the headlight to turn and illuminate the path to the front of the vehicle.

In Figs. 9 and 10 a modified form of the device has been illustrated, in which a means is provided for turning the headlight through a larger angle than the initial turning of the front wheel, then maintaining the light stationary through further turning of the front wheels, and finally to further turn the headlight upon still further turning of the front wheels. This means consists of connecting the radial arm 23 upon a ring 37 rotative within a bracket 38 supported upon the chassis of the vehicle. The bracket 38 is formed with a peripheral slot 39 through which the radial arm 23 projects so that the turning is possible.

Pegs 40 project from the interior of the ring 37 and are capable of engaging against teeth 41 formed upon a portion of the rod 18. As the vehicle is steered, the wheels will be moved to cause the radial arm 23 to turn the ring so that first one of the pegs 40 acts against the teeth 41 to turn the headlight through a much larger distance than the angular turning of the wheel. Then if steering is continued, soon another of the pegs 40 reaches the teeth 41 and causes an additional turn so that the headlight again is turned further in the direction of turning.

It should be recognized that as a vehicle travels, it is to the best interest of the safety of the driver that he see sidewards about a proposed turn before he actually makes the turn. For this reason when the turning is started, the lights will quickly turn in the direction and maintain the new position until a sufficient turning has been accomplished to make it desirable to further turn the lights to further illuminate the road. The provision of the pegs 40 and the teeth 41 upon the rod 18 makes this arrangement very easy. In other respects the modified form of the device is similar to the preferred form.

The operation of the device is automatic, that is, the driver need not bother about working it. While the vehicle travels in a straight line, the headlights will illuminate the road to the front. As soon as a turn is made, the front wheels necessarily must be turned and this movement will be transmitted for turning the headlights for the purpose stated.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In a device of the class described, a radial arm for connection through links to a brake drum of a front wheel, a ring integral with one end of the arm, a bracket rotatively supporting said ring, a rod for supporting a headlight and rotatively supported and passing eccentrically through the ring, and means on said ring and coacting with said rod and for rotating said rod through a larger angle than initial turning of the ring and then maintaining the rod in its turned position and then continuing rotation of the rod all upon rotation of said ring.

2. In a device of the class described, a radial arm for connection through links to a brake drum of a front wheel, a ring integral with one end of the arm, a bracket rotatively supporting said ring, a rod for supporting a headlight and rotatively supported and passing eccentrically through the ring, and means on said ring and coacting with said rod and for rotating said rod through a larger angle than initial turning of the ring and then maintaining the rod in its turned position and then continuing rotation of the rod all upon rotation of said ring comprising gear teeth formed upon the rod, and spaced pegs engageable with said gear teeth and projecting from the internal diameter of said ring.

3. An automatically turning headlight for vehicles, comprising a headlight, a vertical rod supporting said headlight, a ring eccentrically placed around said rod and having an internal diameter considerably larger than the diameter of the rod and rotatively supported on the chassis of the vehicle, means for rotating said ring upon steering the front wheels of the vehicle, and means on the internal periphery of the ring coacting with the rod for turning the headlight through a larger angle than initial turning of the front wheels and then maintaining the light in its turned position during further turning of the front wheels and finally further turning the headlight upon still further turning of the front wheels.

In testimony whereof I have affixed my signature.

DOMENICO RUSSO.